US009982636B2

(12) United States Patent
Kosugi

(10) Patent No.: US 9,982,636 B2
(45) Date of Patent: May 29, 2018

(54) FUEL VAPOR PROCESSING APPARATUS

(71) Applicant: AISAN KOGYO KABUSHIKI KAISHA, Obu-shi, Aichi-ken (JP)

(72) Inventor: Ryuji Kosugi, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 34 days.

(21) Appl. No.: 15/168,900

(22) Filed: May 31, 2016

(65) Prior Publication Data

US 2017/0002771 A1 Jan. 5, 2017

(30) Foreign Application Priority Data

Jul. 1, 2015 (JP) .................................. 2015-132537

(51) Int. Cl.
*F02M 25/08* (2006.01)
*B01D 53/04* (2006.01)

(52) U.S. Cl.
CPC ......... *F02M 25/0854* (2013.01); *B01D 53/04* (2013.01); *B01D 53/0407* (2013.01); *F02M 25/089* (2013.01); *B01D 2253/102* (2013.01); *B01D 2253/304* (2013.01); *B01D 2253/308* (2013.01); *B01D 2253/311* (2013.01); *B01D 2259/403* (2013.01); *B01D 2259/414* (2013.01); *B01D 2259/4516* (2013.01)

(58) Field of Classification Search
CPC ............................. B01D 53/04; B01D 53/047; B01D 2253/102; B01D 2253/304; B01D 2253/308; B01D 2253/311; B01D 2259/403; B01D 2259/414; B01D 2259/4516; F02M 25/0584; F02M 25/089
USPC ....................... 95/146; 96/132, 144; 123/519
See application file for complete search history.

(56) References Cited

U.S. PATENT DOCUMENTS

| | | | | |
|---|---|---|---|---|
| 5,564,398 A | * | 10/1996 | Maeda | F02M 25/0854 123/519 |
| 8,360,034 B2 | | 1/2013 | Yamasaki | |
| 2004/0055468 A1 | * | 3/2004 | Makino | B01D 53/02 96/131 |
| 2005/0204924 A1 | * | 9/2005 | Nakamura | B01D 53/0431 96/147 |
| 2008/0302245 A1 | * | 12/2008 | Yoshida | B01D 53/0415 96/146 |
| 2009/0013973 A1 | | 1/2009 | Yamasaki | |
| 2011/0315126 A1 | * | 12/2011 | Yoshida | F02M 25/0854 123/519 |

(Continued)

FOREIGN PATENT DOCUMENTS

| | | |
|---|---|---|
| JP | 2000-303917 | 10/2000 |
| JP | 2004-225550 A | 8/2004 |

(Continued)

*Primary Examiner* — Frank Lawrence
(74) *Attorney, Agent, or Firm* — Conley Rose, P.C.

(57) ABSTRACT

A fuel vapor processing apparatus may include a first adsorption chamber, a second adsorption chamber and a third adsorption chamber that are connected in series with respect to a flow of gas. A ratio of a length to a diameter of the second adsorption chamber may be larger than that of the first adsorption chamber. A cross sectional area of each of the second and third adsorption chambers may be smaller than a cross sectional area of the first adsorption chamber.

19 Claims, 2 Drawing Sheets

(56) References Cited

U.S. PATENT DOCUMENTS

| | | | |
|---|---|---|---|
| 2012/0186563 A1* | 7/2012 | Hasegawa | B01D 53/0415 123/519 |
| 2013/0284154 A1 | 10/2013 | Makino | |
| 2014/0124385 A1* | 5/2014 | Yamasaki | F02M 25/08 206/0.7 |
| 2014/0165843 A1* | 6/2014 | Omichi | B01D 53/0446 96/144 |
| 2014/0352542 A1* | 12/2014 | Mani | F02M 25/0854 96/154 |
| 2015/0007799 A1* | 1/2015 | Takeshita | F02M 25/0854 123/519 |

FOREIGN PATENT DOCUMENTS

| | | | |
|---|---|---|---|
| JP | 2004-225550 A | * | 12/2004 |
| JP | 2009-19572 A | | 1/2009 |
| JP | 2013-231380 A | | 11/2013 |

\* cited by examiner

FUEL VAPOR PROCESSING APPARATUS

CROSS-REFERENCE TO RELATED APPLICATIONS

This application is based upon and claims priority to Japanese Patent Application Serial No. 2015-132537 filed on Jul. 1, 2015, the contents of which are hereby incorporated by reference in their entirety.

STATEMENT REGARDING FEDERALLY SPONSORED RESEARCH OR DEVELOPMENT

Not applicable.

BACKGROUND

This disclosure generally relates to a fuel vapor processing apparatus that may be mounted to a vehicle.

A fuel vapor processing apparatus has been widely known that may be mounted to a vehicle, such as an automobile, for inhibiting fuel vapor from diffusion to the atmosphere. Japanese Laid-Open Patent Publication No. 2004-225550 discloses a fuel vapor processing apparatus having a plurality of segmented adsorption chambers each containing an adsorbent. In this fuel vapor processing apparatus, one of the adsorbent chambers having a relatively large volume and a relatively large cross sectional area may contain adsorbent granules having a relatively large diameter, while the adsorbent chamber(s) disposed on the side of a purge port with respect the adsorption chamber having the relatively large volume and the relatively large cross sectional area may contain adsorbent granules having a relatively small diameter and a relatively high adsorption ability.

With the construction of the above noted Japanese publication, in which adsorbent granules having a relatively large diameter are contained in the adsorption chamber having a relatively large volume and a relatively large cross sectional area, an increase in size of the fuel vapor processing apparatus is necessary for achieving a sufficient adsorption amount of fuel vapor. In general, release of fuel vapor to the atmosphere from a fuel vapor processing apparatus may occur if a vehicle is parked even a whole day. It may be considered that the external atmospheric air may serve as a heat source to cause fuel vapor to be released from the fuel vapor processing apparatus. The adsorption chamber containing the adsorbent granules having the relatively large diameter disclosed in the above noted Japanese publication may have a relatively large void ratio. Therefore, in the case of the fuel vapor processing apparatus disclosed in the publication, there is a possibility that fuel vapor desorbed from the adsorbent due to the heat of the external atmospheric air may flow through gaps between adjacent adsorption granules to leak to the outside via the atmospheric port.

In view of the challenges discussed above, there is a need for inhibiting an increase of a resistance against flow of gas through a fuel vapor processing apparatus and for inhibiting fuel vapor from being discharged from an atmospheric port of a fuel vapor processing apparatus without accompanying an increase in size of the fuel vapor processing apparatus.

SUMMARY

In one aspect according to the present disclosure, a fuel vapor processing apparatus may include a first adsorption chamber, a second adsorption chamber and a third adsorption chamber that are connected in series with respect to a flow of gas. A ratio of a length to a diameter of the second adsorption chamber may be larger than that of the first adsorption chamber. A cross sectional area of each of the second and third adsorption chambers may be smaller than a cross sectional area of the first adsorption chamber.

In one embodiment, a fuel vapor processing apparatus may include a main adsorption chamber and an adsorption region. The main adsorption chamber may communicate with a tank port and a purge port and may contain a first adsorbent. The adsorption region may be disposed on a side of an atmospheric port with respect to the main adsorption chamber and may include a low filling-ratio adsorption chamber and an atmosphere-side adsorption chamber. The low filling-ratio adsorption chamber may contain a second adsorbent. The atmosphere-side adsorption chamber may contain a third adsorbent. The atmosphere-side adsorption chamber may communicate with the atmospheric port. The low filling-ratio adsorption chamber may be disposed between the atmosphere-side adsorption chamber and the main adsorption chamber. Each of the first adsorbent, the second adsorbent and the third adsorbent may be a plurality of granules. A volumetric capacity of the adsorption region may be smaller than a volumetric capacity of the main adsorption chamber. A ratio of a length of the low filling-ratio adsorption chamber in a direction of flow of fuel vapor to a diameter of a circle having an area equivalent to a cross sectional area of the low filling-ratio adsorption chamber perpendicular to the direction of flow of the fuel vapor may be larger than a ratio of a length of the main adsorption chamber in a direction of flow of the fuel vapor to a diameter of a circle having an area equivalent to a cross sectional area of the main adsorption chamber perpendicular to the direction of flow of the fuel vapor. An average granule diameter of the granules of the second adsorbent within the low filling-ratio adsorption chamber is larger than an average granule diameter of the granules of the first adsorbent contained in the main adsorption chamber and is larger than an average granule diameter of the granules of the third adsorbent contained in the atmosphere-side adsorption chamber. A diameter of a circle having an area equivalent to a cross sectional area of the adsorption region perpendicular to the direction of flow of the fuel vapor may be smaller than the diameter of the circle of the main adsorption chamber.

With this arrangement, the low filling-ratio adsorption chamber may contain the second adsorbent that may have a relatively large average granule diameter, while the first adsorbent contained in the main adsorption chamber may have a relatively small diameter. In addition, the volumetric capacity of the adsorption region including the low filling-ratio adsorption chamber may have a relatively small value. Further, the cross sectional area of the adsorption region may be set to have a relatively small value. Therefore, it may be possible to ensure a necessary adsorption amount of fuel vapor and to inhibit an increase in a potential pressure loss and an increase in size of the fuel vapor processing apparatus. Further, it may be possible to inhibit fuel vapor from being discharged from the atmospheric port.

A pore volume per unit mass of the granules of the third adsorbent contained in the atmosphere-side adsorption chamber may be larger than a pore volume per unit mass of the granules of the second adsorbent contained in the low filling-ratio adsorption chamber. With this setting of the pore volume, it may be possible to further reliably inhibit fuel vapor from being discharged from the atmospheric port.

Additionally or alternatively, the pore volume per unit mass of the granules of the third adsorbent contained in the atmosphere-side adsorption chamber may be larger than a pore volume per unit mass of the granules of the first adsorbent contained in the main adsorption chamber. With this setting of the pore volume, it may be possible to further reliably inhibit fuel vapor from being discharged from the atmospheric port without accompanying an increase in volume of the atmosphere-side adsorption chamber.

An average pore diameter of the granules of the third adsorbent contained in the atmosphere-side adsorption chamber may be smaller than an average pore diameter of the granules of the second adsorbent contained in the low filling-ratio adsorption chamber. With this setting of the average pore diameter, it may be possible to further reliably inhibit fuel vapor from being discharged from the atmospheric port while ensuring fuel vapor to be retained in the atmosphere-side adsorption chamber.

Additionally or alternatively, the average pore diameter of the granules of the third adsorbent contained in the atmosphere-side adsorption chamber may be smaller than an average pore diameter of the granules of the first adsorbent contained in the main adsorption chamber. Also with this setting of the average pore diameter, it may be possible to further reliably inhibit fuel vapor from being discharged from the atmospheric port while ensuring fuel vapor to be retained in the atmosphere-side adsorption chamber.

The granules of the second adsorbent contained in the low filling-ratio adsorption chamber may include a plurality of solid or hollow granules each having either a spherical shape or a polygonal column shape. The granules having any of these shapes may be effectively used for setting a small or low filling ratio of the second adsorbent.

Each of the granules of the second adsorbent and the third adsorbent may have a length and a diameter, and an aspect ratio of the length to the diameter of each of the granules of the second adsorbent may be larger than an aspect ratio of the length to the diameter of each of the granules of the third adsorbent. With this setting of the aspect ratio, it may be possible to easily set a filling ratio of the second adsorbent to have a smaller value.

Additionally or alternatively, each of the granules of the first adsorbent and the second adsorbent may have a length and a diameter, and an aspect ratio of the length to the diameter of each of the granules of the second adsorbent may be larger than an aspect ratio of the length to the diameter of each of the granules of the first adsorbent. Also with this setting of the aspect ratio, it may be possible to easily set a filling ratio of the second adsorbent to have a smaller value than a filling ratio of the first adsorbent.

A variation in sizes of the granules of the second adsorbent may be smaller than a variation in sizes of the granules of the third adsorbent. Also with this setting of the variation in size, it may be possible to easily set a filling ratio of the second adsorbent to have a smaller value.

Additionally or alternatively, the variation in sizes of the granules of the second adsorbent may be smaller than a variation in sizes of the granules of the first adsorbent. Also with this setting of the variation in size, it may be possible to easily set a filling ratio of the second adsorbent to have a smaller value than a filling ratio of the first adsorbent.

DETAILED DESCRIPTION

Figure 1:
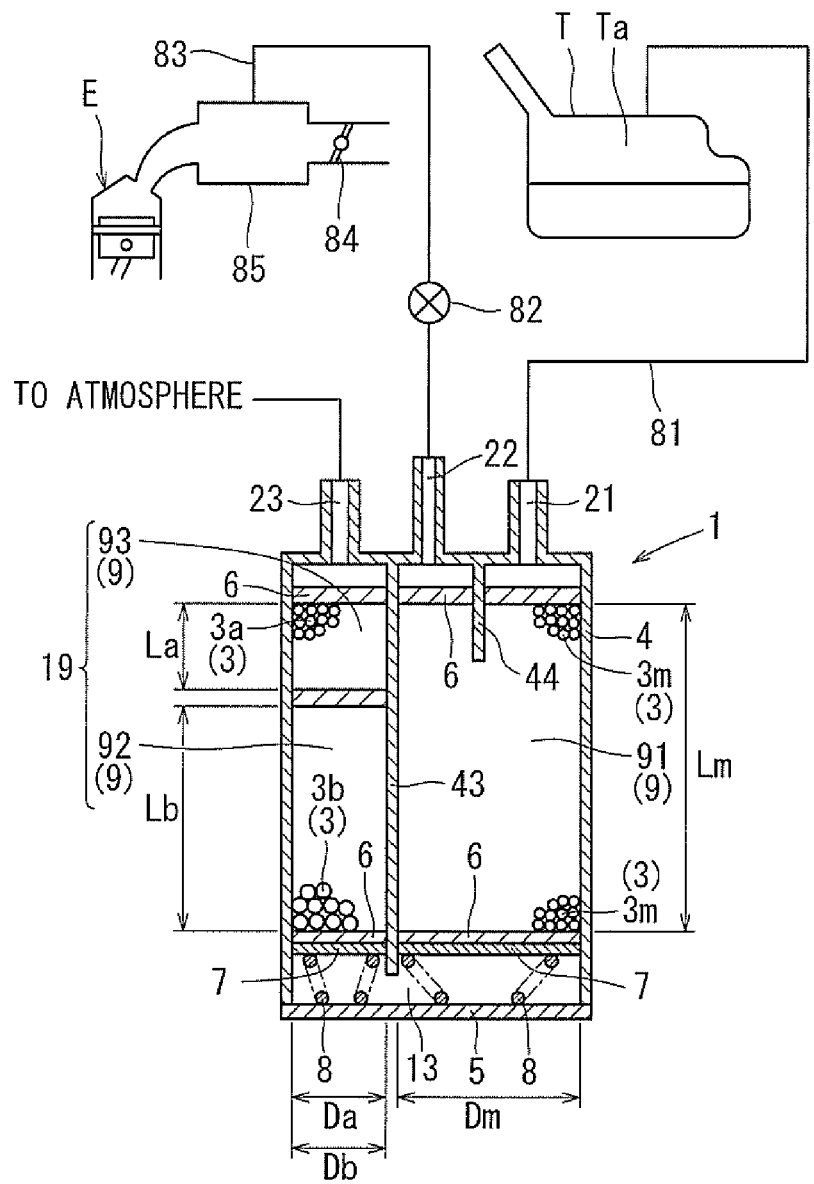
FIG. 1 is a schematic view illustrating an internal structure of a fuel vapor processing apparatus connected to an internal combustion engine, according to a first embodiment.

A first embodiment will now be described with reference to FIG. 1. Referring to FIG. 1, there is shown a fuel vapor processing apparatus 1 that may be mounted to a vehicle, in particular a wheeled vehicle, such as an automobile. The fuel vapor processing apparatus 1 of this embodiment may be an apparatus called a canister that may contain adsorbent granules 3, such as activated carbon granules. As shown in FIG. 1, the fuel vapor processing apparatus may include a tank port 21, a purge port 22 and an atmospheric port 23. The tank port 21 may communicate with an upper gaseous space Ta of a fuel tank T via a fuel vapor passage 81. The purge port 22 may communicate with an internal combustion engine E via a purge passage 83 and an intake pipe 85. A purge valve 82 may be disposed in the purge passage 83. A throttle valve 84 may be disposed in the intake pipe 85. The atmospheric port 23 may be opened to the atmosphere.

The tank port 21 may serve as an introduction port through which fuel vapor flown from within the fuel tank T is introduced into the fuel vapor processing apparatus 1. The purge port 22 may serve as a discharge port through which fuel vapor desorbed from within the fuel vapor processing apparatus is discharged to the internal combustion engine E via the purge passage 83. The atmospheric port 23 may serve as an introduction port through which the atmospheric air is introduced into the fuel vapor processing apparatus 1.

An adsorption chamber 9 may be defined in the internal space of the fuel vapor processing apparatus 1 and may be partitioned into a plurality of chamber portions each containing the adsorption granules 3, by a plurality of gas permeable members, such as filters 6. In this embodiment, the chamber portions of the adsorption chamber 9 may include a main adsorption chamber 91, a low filling-ratio adsorption chamber 92 and an atmosphere-side adsorption chamber 93. The main adsorption chamber 91 may be in communication with the tank port 21 and the purge port 22. In this embodiment, the volume of the main adsorption chamber 91 capable of containing the adsorption granules 3, i.e., a volumetric capacity of the main adsorption chamber 91, may be set to be larger than the volume of an adsorption region 19 capable of containing the adsorption granules 3, i.e., a volumetric capacity of the adsorption region 19. The adsorption region 19 may be disposed on the side of the atmospheric port 23 with respect to the main adsorption chamber 91. The adsorption region 19 may include the low filling-ratio adsorption chamber 92 and the atmosphere-side adsorption chamber 93. The low filling-ratio adsorption chamber 92 may contain the adsorption granules 3 having a diameter larger than a diameter of the adsorption granules 3 contained in the main adsorption chamber 91. The atmosphere-side adsorption chamber 93 may communicate with the atmospheric port 23. The adsorption granules 3 contained in the atmosphere-side adsorption chamber 93 may have a diameter that is smaller than the diameter of the adsorption granules 3 contained in the low filling-ratio adsorption chamber 92.

In this embodiment, as will be explained later in detail, a value of L/D, where "L" represents a length of each of the chamber portions of the adsorption chamber 9 in a direction of flow of fuel vapor, and "D" represents a diameter of a circle having an area equivalent to a cross sectional area of each of the chamber portions perpendicular to the direction of flow of the fuel vapor, may be determined such that the L/D value of the low filling-ratio adsorption chamber 92 is larger than the L/D value of the atmosphere-side adsorption chamber 93.

Further, the diameter "D" of the adsorption region 19 may be determined to be smaller than the diameter "D" of the main adsorption chamber 91. With this setting, it may be possible to inhibit fuel vapor from flowing to the outside via the atmospheric port 23 while ensuring a sufficient adsorption amount of fuel vapor. In addition it may be possible to inhibit a potential pressure loss on the side of the atmospheric port 23 from excessively increasing than that in the main adsorption chamber 91 and to inhibit an increase in size of the fuel vapor processing apparatus 1.

The fuel vapor processing apparatus 1 may further include a case body 4 and a closure member 5. The case body 4 may have a substantially rectangular tubular shape. The closure member 5 may be attached to the bottom of the case body 4 for closing a bottom opening of the case body 4. The case body 4 may include the tank port 21, the purge port 22 and the atmospheric port 23. Within the case body 4, a partitioning wall 43 may extend from the top wall of the case body 4 to a position near the closure member 5, and a dividing wall 44 may also extend from the top wall of the case body 4 by a distance shorter than the length of the partitioning wall 43. The partitioning wall 44 may serve to define a substantially U-shaped passageway within the case body 4, so that the atmospheric air introduced into the case body 4 via the atmospheric port 23 may flow upward toward the purge port 22 after flowing downward toward the closure member 5. With this arrangement, it may be possible to ensure that gas (fuel vapor or atmospheric air) flowing through the fuel vapor processing apparatus 1 may contact the adsorbent granules 3 disposed on opposite sides of the partitioning wall 43. The dividing wall 44 may partly divide one of the spaces defined by the partitioning wall 43 into a portion on the side of the tank port 21 and a portion on the side of the purge port 22.

The filters 6 may be disposed within the case body 4 for retaining the adsorption granules 3. Each of the filters 6 may be formed on a gas-permeable porous or perforated material, such as non-woven fabric or urethane foam. The filters 6 may include those disposed to be opposed to the tank port 21, the purge port 22 and the atmospheric port 23 and may also include those disposed to be opposed to the closure member 5. The adsorption granules 3 may be filled between the filters 6 opposing to the tank port 21, the purge port 22 and the atmospheric port 23 and the filters 6 opposing to the closure member 5. A gas-permeable plate 7 may be disposed adjacent to each of the filters 6 that are opposed to the closure member 5. The gas-permeable plate 7 may have a lattice structure. A spring 8 may be disposed between each gas-permeable plate 7 and the closure member 5 and may serve to apply an adequate pressing force against the gas-permeable plate 7 toward the corresponding port(s) (i.e., toward the tank port 21 and the purge port 22 or toward the atmospheric port 23).

The inner wall of the case body 4, the partitioning wall 43 and the filters 6 may define the adsorption chamber 9 including three chamber portions, i.e., the main adsorption chamber 91, the low filling-ratio adsorption chamber 92 and the atmosphere-side adsorption chamber 93. The low filling-ratio adsorption chamber 92 may be located between the main adsorption chamber 91 communicating with the tank port 21 and the purge port 22 and the atmosphere-side adsorption chamber 93 communicating with the atmospheric port 23. More specifically, the low filling-ratio adsorption chamber 92 may communicate with the main adsorption chamber 91 via a communication passage 13 formed along the closure member 5. Therefore, fuel vapor may necessary flow through the communication passage 13 when it flows between the main adsorption chamber 91 and the atmosphere-side adsorption chamber 93. In this embodiment, the springs 8 that apply pressing forces against the gas-permeable plates 7 may be disposed within the communication passage 13.

A direction of flow of gas within the fuel vapor processing apparatus 1 may change depending on a balance between pressures applied externally via the tank port 21, the purge port 22 and the atmospheric port 23. For example, when the operation of the internal combustion engine E is stopped, fuel vapor may flow from the tank port 21 to the atmospheric port 23. During this flow of fuel vapor, the adsorbent granules 3 may adsorb the fuel vapor. When the internal combustion engine E is operated, atmospheric air may flow into the atmospheric port 23 and may flow further toward the purge port 22 due to a negative pressure applied from within the intake pipe 85. During this flow of the atmospheric air, fuel vapor may be desorbed form the adsorbent granules 3.

For the purpose of explanation, the length of the main adsorption chamber 91 in a direction of flow of gas may be indicated by "Lm", and a diameter of a circle having an area equivalent to a cross sectional area of the main adsorption chamber 91 perpendicular to the direction of flow of gas may be indicated by "Dm." Similarly, the length of the low filling-ratio adsorption chamber 92 in a direction of flow of gas may be indicated by "Lb", and a diameter of a circle having an area equivalent to a cross sectional area of the low filling-ratio adsorption chamber 92 perpendicular to the direction of flow of gas may be indicated by "Db." Similarly, the length of the atmosphere-side adsorption chamber 93 in a direction of flow of gas may be indicated by "La", and a diameter of a circle having an area equivalent to a cross sectional area of the atmosphere-side adsorption chamber 93 perpendicular to the direction of flow of gas may be indicated by "Da."

In this embodiment, "Da" and "Db" may be set to be equal to each other, while "Dm" may be set to be larger than "Da" (and therefore also larger than "Db"). In other words, the cross sectional area of the main adsorption chamber 91 may be set to be larger than the cross sectional area of the adsorption region 19. Further, in this embodiment, "La" may be set to be shorter than "Lb", and "Lb" may be set to be shorter than "Lm." Furthermore, Lb/Db (i.e. a ratio of "Lb" to "Db") may be set to be larger than Lm/Dm (i.e. a ratio of "Lm" to "Dm") and to be also larger than La/Da (i.e., a ratio of "La" to "Da")

The adsorption granules 3 contained in the main adsorption chamber 91 (hereinafter called "adsorption granules 3m") may have granule diameters and performance similar to those of adsorption granules that are generally used in this kind of fuel vapor processing apparatuses. Therefore, adsorption granules used as the adsorption granules 3m of the main adsorption chamber 91 will be hereinafter called "general adsorption granules." The fuel vapor processing apparatus 1 of this embodiment is designed such that the general adsorption granules 3m are most extensively used as the adsorption granules 3. The adsorption granules 3 contained in the low filling-ratio adsorption chamber 92 (hereinafter called "adsorption granules 3b") may have an average granule diameter larger than an average granule diameter of the adsorption granules 3m contained in the main adsorption chamber 91. In general, the adsorbent granules 3 may have substantially cylindrical shapes. Therefore, when the adsorbent granules 3b are filled within the low filling-ratio adsorption chamber 92, relatively large gaps may be formed between the adsorbent granules 3b. In this way, it may be possible to fill the adsorbent granules 3b with a filling ratio (i.e., the volume of space occupied by adsorbent divided by the total volume of the corresponding chamber) smaller or lower than that achieved by filling the general adsorption granules 3m. Here, an average granule diameter of adsorbent granules may be determined based on whether or not the adsorbent granules pass through meshes having a predetermined size of a sieve. Therefore, it is not necessary for the adsorbent granules 3 to have spherical shapes. Thus, the adsorbent granules 3 may have cylindrical shapes as described above or any other shapes, such as polygonal column shapes. It may be also possible that the adsorbent granules 3 have hollow structures.

The adsorbent granules 3b filled within the low filling-ratio adsorption chamber 92 may have an aspect ratio that is larger than an aspect ratio of the adsorbent granules 3a filled within the atmosphere-side adsorption chamber 93. In other words, the aspect ratio of the adsorbent granules 3b may larger than the aspect ratio of the other adsorbent granules 3a of the adsorbent granules 3 filled within the adsorbent region 19. Further, the aspect ratio of the adsorbent granules 3b may be larger than an aspect ratio of the adsorbent granules 3m filed within the main adsorption chamber 91. In this embodiment, the aspect ratio of the adsorption granules 3 may be a value Las/Das (i.e. a ratio of "Las" to "Das"), where "Las" is a length (axial length) of the adsorption granule 3, and "Das" is a diameter of the adsorption granule 3.

With the aspect ratios determined in this way, a filling ratio of the adsorbent granules 3b within the low filling-ratio adsorption chamber 92 may be set to be lower (smaller) than a filling ratio of the adsorbent granules 3m within the main adsorption chamber 91 and also lower (smaller) than a filling ratio of the adsorbent granules 3a within the atmosphere-side adsorption chamber 93.

The adsorbent granules 3b filled within the low filling-ratio adsorption chamber 92 may be chosen such that a variation in size is smaller than that of the adsorption granules 3a filled within the atmosphere-side adsorption chamber 93. In other words, a variation in size of the adsorbent granules 3b may be smaller than a variation in size of the other adsorbent granules 3a of the adsorbent granules 3 filled within the region 19. Further, a variation in size of the adsorbent granules 3b may be smaller than a variation in size of the adsorbent granules 3m filed within the main adsorption chamber 91. With a smaller variation in size of the adsorbent granules 3b, it may be also possible to set the filling ratio of the adsorbent granules 3b within the low filling-ratio adsorption chamber 92 to be lower (smaller) than the filling ratio of the adsorbent granules 3m within the main adsorption chamber 91 and also lower (smaller) than the filling ratio of the adsorbent granules 3a within the atmosphere-side adsorption chamber 93.

As described previously, the pore volume per unit mass of the adsorption granules 3 contained in the atmosphere-side adsorption chamber 93 (i.e., the adsorption granules 3a) may be set to be larger than that of the adsorption granules 3 contained in the low filling-rate adsorption chamber 92 (i.e., the adsorption granules 3b). In other words, the pore volume per unit mass of the adsorbent granules 3a may be larger than the pore volume per unit mass of the other adsorbent granules 3b of the adsorbent granules 3 filled within the region 19. Further, the pore volume per unit mass of the adsorbent granules 3a may be larger than a pore volume per unit mass of the adsorbent granules 3m filed within the main adsorption chamber 91. With this setting of the pore volume, an adsorption amount per unit mass available by the adsorption granules 3a may be larger than that available by the adsorbent granules 3b and may be also larger than that available by the adsorbent granules 3m.

Further, an average pore diameter of the adsorption granules 3a contained in the atmosphere-side adsorption chamber 93 may be set to be smaller than an average pore diameter of the adsorption granules 3b contained in the low filling-rate adsorption chamber 92. (i.e., the adsorption granules 3a). In other words, the average pore diameter of the adsorbent granules 3a may be smaller than the average pore diameter of the other adsorbent granules 3b of the adsorbent granules 3 filled within the region 19. Further, the average pore diameter of the adsorbent granules 3a may be smaller than an average pore diameter of the adsorbent granules 3m filed within the main adsorption chamber 91.

Further, an average granule diameter of the adsorption granules 3a filled within the atmosphere-side adsorption chamber 93 may be smaller than the average granule diameter of the adsorption granules 3b filled within the low filling-ratio adsorption chamber 92. In this way, it may be possible to set the filling ratio of the adsorption granules 3a within the atmosphere-side adsorption chamber 93 to be larger than the filling ratio of the adsorption granules 3b filled within the low filling-ratio adsorption chamber 92. While the filling ratio of the adsorption granules 3a in the atmosphere-side adsorption chamber 93 being set to be larger than that of the adsorption granules 3b in the low filling-ratio adsorption chamber 92, setting the length "La" of the atmosphere-side adsorption chamber 93 in the flow direction to be relatively short may inhibit a potential pressure loss produced in the atmosphere-side adsorption chamber 93 from being excessively increased. More specifically, with the diameter "Db" of the low the low filling-ratio adsorption chamber 92 and the diameter "Da" of the atmosphere-side adsorption chamber 93 set to be equal to each other, the length "La" of the atmosphere-side adsorption chamber 93 may be set to be shorter than the length "Lb" of the low filling-ratio adsorption chamber 92 in the flow direction. In this embodiment, it may be determined to be "Lm>Lb>La" and "Lm>La+Lb."

With the above determination or setting of the filling ratio of the adsorption granules 3, a void ratio of the low filling-ratio adsorption chamber 92 may be larger than a void ratio of the main adsorption chamber 91. Further, the void ratio of the low filling-ratio adsorption chamber 92 may be larger than a void ratio of the atmosphere-side adsorption chamber 93.

According to the fuel vapor processing apparatus 1 of this embodiment, it may be possible to inhibit or minimize a potential pressure loss that may be caused by the adsorbent granules 3. This may enable a smooth refueling operation of the fuel tank T. Further, during a purge operation, it may be possible to sufficiently desorb fuel vapor from within the atmosphere-side adsorption chamber 93 that may have a relatively small volume and a relatively small cross sectional area. Therefore, it may be possible to inhibit fuel vapor from being discharged to the outside via the atmospheric port 23. Furthermore, because the main adsorption chamber 91 has a relatively large volume, it is possible to ensure a sufficient adsorption amount of fuel vapor.

Further with the above determination of the geometric features of the main adsorption chamber 91 and the region 19 located between the main adsorption chamber 91 and the atmospheric port 23 defined in the case body 4, it may be also possible to inhibit fuel vapor from being discharged to the outside via the atmospheric port 23 and to reduce a potential pressure loss. Furthermore, it may be possible to configure the fuel vapor processing apparatus 1 to be compact in design.

Figure 2:
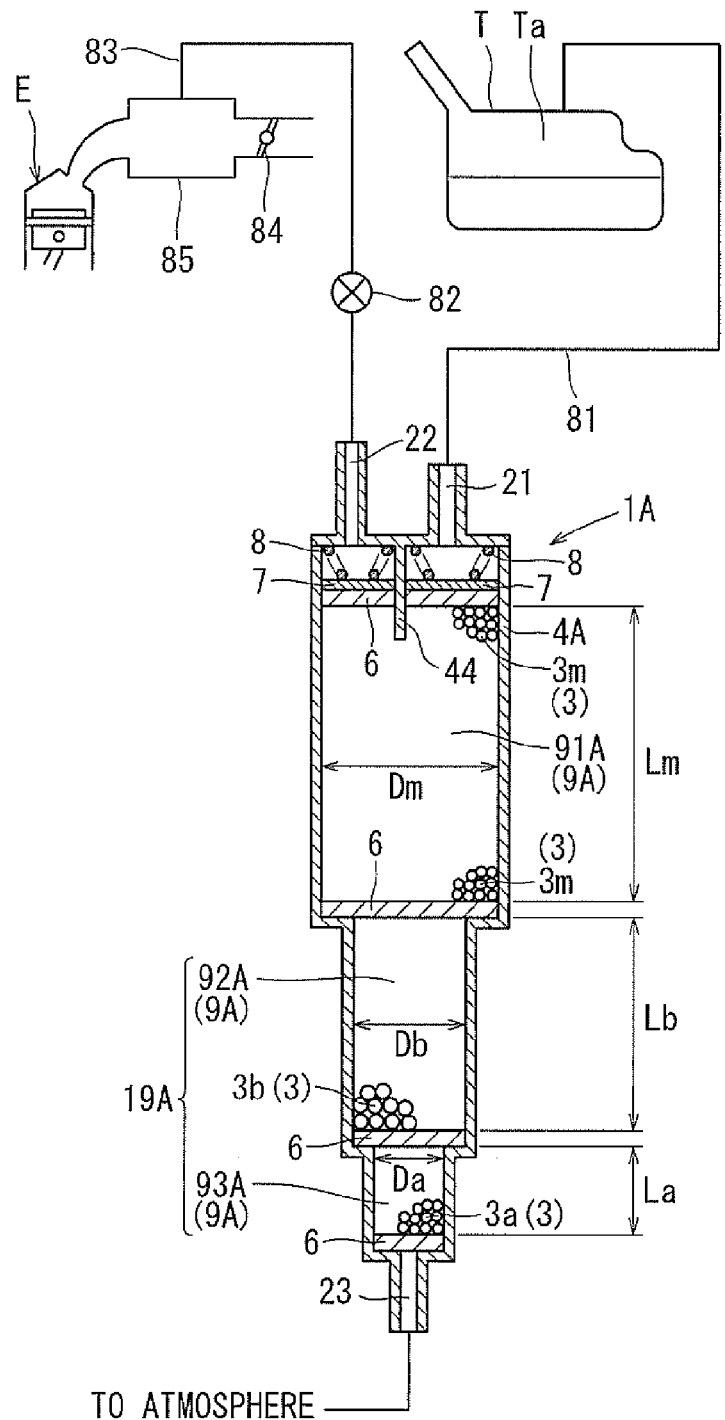
FIG. 2 is a schematic view illustrating an internal structure of a fuel vapor processing apparatus connected to an internal combustion engine, according to a second embodiment.

A second embodiment will now be described with reference to FIG. 2. The second embodiment is a modification of the first embodiment, and therefore, in FIG. 2, like members are given the same reference numerals as the first embodiment and description of these members will be omitted. The fuel vapor processing apparatus 1 of the first embodiment is designed as a U-flow type apparatus in which a U-shaped flow passage is defined between the atmospheric port 23 and the other two ports, i.e., the tank port 21 and the vapor port 22. A fuel vapor processing apparatus 1A of the second embodiment is designed as an I-flow type apparatus in which a straight flow passage is defined between the atmospheric port 23 and the other two ports. In the second embodiment, an adsorption chamber 9A may be defined in a case body 4A and may include a plurality of chamber portions each containing the adsorption granules 3. The chamber portions of the adsorption chamber 9A may include a main adsorption chamber 91A, a low filling-ratio adsorption chamber 92A, and an atmosphere-side adsorption chamber 93A that may correspond to the main adsorption chamber 91, the low filling-ratio adsorption chamber 92 and the atmosphere-side adsorption chamber 93, respectively, of the first embodiment. In the second embodiment, the main adsorption chamber 91A, the low filling-ratio adsorption chamber 92A, and the atmosphere-side adsorption chamber 93A may be connected in series along a straight line. A volume (volumetric capacity) of the atmosphere-side adsorption chamber 93A may be smaller than that of the low filling-ratio adsorption chamber 92A, and the volume (volumetric capacity) the low filling-ratio adsorption chamber 92A may be smaller than that of the main adsorption chamber 91A. Similar to the first embodiment, the main adsorption chamber 91A may contain the adsorbent granules $3m$, the low filling-ratio adsorption chamber 92A may contain the adsorbent granules $3b$, and the atmosphere-side adsorption chamber 93A may contain the adsorbent granules $3a$. As described in connection with the first embodiment, for example, the average granule diameter of the adsorbent granules $3b$ contained in the low filling-ratio adsorption chamber 92A may be larger than the average granule diameter of the adsorbent granules $3m$ contained in the main adsorption chamber 91A and may be also larger than the average granule diameter of the adsorbent granules $3a$ contained in the atmosphere-side adsorption chamber 93A. Further, the pore volume per unit mass of the adsorption granules $3a$ contained in the atmosphere-side adsorption chamber 93A may be set to be larger than that of the adsorption granules $3b$ contained in the low filling-rate adsorption chamber 92A.

Similar to the first embodiment, the low filling-ratio adsorption chamber 92A and the atmosphere-side adsorption chamber 93A may define an adsorption region 19A, and the volumetric capacity of the adsorption region 19A, i.e., the sum of the volumetric capacities of the low filling-ratio adsorption chamber 92A and the atmosphere-side adsorption chamber 93A, may be set to be smaller than the volumetric capacity of the main adsorption chamber 91A.

Also, similar to the first embodiment, it may be determined to be "Lm>Lb>La", where "Lm" is a length of the main adsorption chamber 91A in the flow direction, "Lb" is a length of the low filling-ratio adsorption chamber 92A in the flow direction, and "La" is a length of the atmosphere-side adsorption chamber 93A in the flow direction.

However, in the second embodiment, it may be determined to be "Dm>Db>Da", where "Dm" is a diameter of a circle having an area equivalent to a cross sectional area of the main adsorption chamber 91A perpendicular to the direction of flow of gas, "Db" is a diameter of a circle having an area equivalent to a cross sectional area of the low filling-ratio adsorption chamber 92A perpendicular to the direction of flow of gas, and "Da" is a diameter of a circle having an area equivalent to a cross sectional area of the atmosphere-side adsorption chamber 93A perpendicular to the direction of flow of gas. With the determination of "Lm>Lb>La" and "Dm>Db>Da", the volumetric capacity of the main adsorption chamber 91A may be larger than the volumetric capacity of the low filling-ratio adsorption chamber 92A, and the volumetric capacity of the low filling-ratio adsorption chamber 92A may be larger than the volumetric capacity of the atmosphere-side adsorption chamber 93A.

The second embodiment may be modified such that the volumetric capacity of the low filling-ratio adsorption chamber 92A is equal to the volumetric capacity of the atmosphere-side adsorption chamber 93A. Further, the second embodiment may be modified such that "Db" is equal to "Da" as in the case of the first embodiment.

The above first and second embodiments may be modified to include a heating device, such as a heater, disposed within the case body for heating the adsorbent granules 3. Further, although each of the fuel vapor processing apparatuses of the above embodiments includes three adsorption chambers, i.e., the main adsorption chamber 91(91A), the low filling-ratio adsorption chamber 92(92A), and the atmosphere-side adsorption chamber 93(93A), it may be possible to provide four or more adsorption chambers. For example, an additional adsorption chamber may be provided between the main adsorption chamber 91(91A) and the low filling-ratio adsorption chamber 92(92A), so that the additional adsorption chamber may adsorb a part of fuel vapor that could not be adsorbed in the main adsorption chamber 91(91A).

Furthermore, although activated carbon is used as a material for the adsorbent granules 3 in the above embodiments, it may be possible to use any other adsorption material than activated carbon. It may be also possible to use activated carbon for some of the adsorbent granules 3 and to use another adsorption material for the other of the adsorbent granules 3.

Furthermore, the adsorbent granules 3 contained in each adsorption chamber may be replaced with a molded adsorbent molded from a mixture of an adsorbent (in the form of powder, particles or granules) and a binder. However, the adsorbent granules 3 without being bonded by a binder may be preferable in order to fully exert the adsorption ability of the adsorbent.

Furthermore, although the low filling-ratio adsorption chamber 92(92A) and the atmosphere-side adsorption chamber 93(93A) in the adsorption region 19(19A) in each of the above embodiments are arranged in series with each other, i.e., along a straight line, they may be arranged in parallel to each other similar to the arrangement of the main adsorption chamber 91 and the low filling-ratio adsorption chamber 92 of the first embodiment. In such a case, the direction of flow of gas may be changed at a joint portion between the low filling-ratio adsorption chamber 92(92A) and the atmosphere-side adsorption chamber 93(93A).

Further, although the cross sectional area of each of three adsorption chambers, i.e., the main adsorption chamber 91(91A), the low filling-ratio adsorption chamber 92(92A), and the atmosphere-side adsorption chamber 93(93A) is constant throughout its length along the flow direction, it may be possible to vary the cross sectional area along the length. In such a case, the diameter "Dm", "Db" or "Da" may be determined to be a diameter of a cylindrical space having a volume equivalent to the volumetric capacity of the corresponding adsorption chamber and having a same length as that of the corresponding adsorption chamber.

Further, the above teachings may be applied to any other fuel vapor processing apparatuses than those used for wheeled vehicles. For example, the above teachings may be applied to fuel vapor processing apparatuses used for aero vehicles, such as airplanes and helicopters, and marine vehicles, such as ships and submarines.

The various examples described above in detail with reference to the attached drawings are intended to be representative and thus not limiting. The detailed description is intended to teach a person of skill in the art to make, use and/or practice various aspects of the present teachings and thus is not intended to limit the scope of the invention. Furthermore, each of the additional features and teachings disclosed above may be applied and/or used separately or with other features and teachings to provide improved fuel vapor processing apparatuses, and/or methods of making and using the same.

Moreover, the various combinations of features and steps disclosed in the above detailed description may not be necessary to practice the invention in the broadest sense, and are instead taught to describe representative examples of the invention. Further, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed as informational, instructive and/or representative and may thus be construed separately and independently from each other. In addition, all value ranges and/or indications of groups of entities are also intended to include possible intermediate values and/or intermediate entities for the purpose of original written disclosure, as well as for the purpose of restricting the claimed subject matter.

What is claimed is:

1. A fuel vapor processing apparatus, comprising:
    a main adsorption chamber communicating with a tank port and a purge port and containing a first adsorbent;
    an adsorption region disposed on a side of an atmospheric port with respect to the main adsorption chamber;
    wherein:
        the adsorption region includes a low filling-ratio adsorption chamber containing a second adsorbent, and an atmosphere-side adsorption chamber containing a third adsorbent, the atmosphere-side adsorption chamber communicating with the atmospheric port, and the low filling-ratio adsorption chamber being disposed between the atmosphere-side adsorption chamber and the main adsorption chamber, each of the first adsorbent, the second adsorbent and the third adsorbent comprising a plurality of granules;
        a volumetric capacity of the adsorption region is smaller than a volumetric capacity of the main adsorption chamber;
        a ratio of a length of the low filling-ratio adsorption chamber in a direction of flow of fuel vapor to a diameter of a circle having an area equivalent to a cross sectional area of the low filling-ratio adsorption chamber perpendicular to the direction of flow of the fuel vapor is larger than a ratio of a length of the main adsorption chamber in a direction of flow of the fuel vapor to a diameter of a circle having an area equivalent to a cross sectional area of the main adsorption chamber perpendicular to the direction of flow of the fuel vapor;
        an average granule diameter of the granules of the second adsorbent within the low filling-ratio adsorption chamber is larger than both an average granule diameter of the granules of the first adsorbent contained in the main adsorption chamber and an average granule diameter of the granules of the third adsorbent contained in the atmosphere-side adsorption chamber; and
        a diameter of a circle having an area equivalent to a cross sectional area of the adsorption region perpendicular to the direction of flow of the fuel vapor is smaller than the diameter of the circle having an area equivalent to a cross sectional area of the main adsorption chamber perpendicular to the direction of flow of the fuel vapor.

2. The fuel vapor processing apparatus according to claim 1, wherein:
    a pore volume per unit mass of the granules of the third adsorbent contained in the atmosphere-side adsorption chamber is larger than a pore volume per unit mass of the granules of the second adsorbent contained in the low filling-ratio adsorption chamber.

3. The fuel vapor processing apparatus according to claim 1, wherein:
    a pore volume per unit mass of the granules of the third adsorbent contained in the atmosphere-side adsorption chamber is larger than a pore volume per unit mass of the granules of the first adsorbent contained in the main adsorption chamber.

4. The fuel vapor processing apparatus according to claim 1, wherein:
    an average pore diameter of the granules of the third adsorbent contained in the atmosphere-side adsorption chamber is smaller than an average pore diameter of the granules of the second adsorbent contained in the low filling-ratio adsorption chamber.

5. The fuel vapor processing apparatus according to claim 1, wherein:
    an average pore diameter of the granules of the third adsorbent contained in the atmosphere-side adsorption chamber is smaller than an average pore diameter of the granules of the first adsorbent contained in the main adsorption chamber.

6. The fuel vapor processing apparatus according to claim 1, wherein:
    the granules of the second adsorbent contained in the low filling-ratio adsorption chamber comprise a plurality of solid or hollow granules each having either a spherical shape or a polygonal column shape.

7. The fuel vapor processing apparatus according to claim 1, wherein:
    each of the granules of the second adsorbent and the third adsorbent has a length and a diameter; and
    an aspect ratio of the length to the diameter of each of the granules of the second adsorbent is larger than an aspect ratio of the length to the diameter of each of the granules of the third adsorbent.

8. The fuel vapor processing apparatus according to claim 1, wherein:
each of the granules of the first adsorbent and the second adsorbent has a length and a diameter; and
an aspect ratio of the length to the diameter of each of the granules of the second adsorbent is larger than an aspect ratio of the length to the diameter of each of the granules of the first adsorbent.

9. The fuel vapor processing apparatus according to claim 1, wherein:
a variation in sizes of the granules of the second adsorbent is smaller than a variation in sizes of the granules of the third adsorbent.

10. The fuel vapor processing apparatus according to claim 1, wherein:
a variation in sizes of the granules of the second adsorbent is smaller than a variation in sizes of the granules of the first adsorbent.

11. A fuel vapor processing apparatus, comprising:
a first adsorption chamber defining a first volumetric capacity and containing a first adsorbent;
a second adsorption chamber defining a second volumetric capacity and containing a second adsorbent; and
a third adsorption chamber defining a third volumetric capacity and containing a third adsorbent;
wherein:
the first, second and third adsorption chambers are connected in series such that the first adsorption chamber is located on an upstream side of the second adsorption chamber with respect to a direction of flow of fuel vapor to be adsorbed and on a downstream side of the second adsorption chamber with respect to a direction of flow of atmospheric air for desorption of adsorbed fuel vapor;
a sum of the second volumetric capacity and the third volumetric capacity is smaller than the first volumetric capacity;
a ratio of a length of the second adsorption chamber in the direction of flow of the fuel vapor or the atmospheric air to a cross sectional area of the second adsorption chamber perpendicular to the direction of flow of the fuel vapor or the atmospheric air is larger than a ratio of a length of the first adsorption chamber in a direction of flow of the fuel vapor or the atmospheric air to a cross sectional area of the first adsorption chamber perpendicular to the direction of flow of the fuel vapor or the atmospheric air;
the cross sectional area of the second adsorption chamber is smaller than the cross sectional area of the first adsorption chamber;
a cross sectional area of the third adsorption chamber perpendicular to the direction of flow of the fuel vapor or the atmospheric air is smaller than the cross sectional area of the first adsorption chamber;
each of the first, second and third adsorbents comprises a plurality of granules;
the granules of the first adsorbent have a first average granule diameter;
the granules of the second adsorbent have a second average granule diameter;
the granules of the third adsorbent have a third average granule diameter; and
the second average granule diameter is larger than both the first average granule diameter and the third average granule diameter.

12. The fuel vapor processing apparatus according to claim 11, wherein:
the granules of the first adsorbent have a first average pore diameter and a first pore volume per unit mass;
the granules of the second adsorbent have a second average pore diameter and a second pore volume per unit mass; and
the granules of the third adsorbent have a third average pore diameter and a third pore volume per unit mass.

13. The fuel vapor processing apparatus according to claim 12, wherein:
the third pore volume is larger than the second pore volume.

14. The fuel vapor processing apparatus according to claim 12, wherein:
the third pore volume is larger than the first pore volume.

15. The fuel vapor processing apparatus according to claim 12, wherein:
the third average pore diameter is smaller than the second average pore diameter.

16. The fuel vapor processing apparatus according to claim 12, wherein:
the third average pore diameter is smaller than the first average pore diameter.

17. The fuel vapor processing apparatus according to claim 11, wherein:
each of the granules of the first adsorbent, the second adsorbent and the third adsorbent has a length and a diameter; and
an aspect ratio of the length to the diameter of each of the granules of the second adsorbent is larger than an aspect ratio of the length to the diameter of each of the granules of the third adsorbent and is larger than an aspect ratio of the length to the diameter of each of the granules of the first adsorbent.

18. The fuel vapor processing apparatus according to claim 11, wherein:
a variation in sizes of the granules of the second adsorbent is smaller than both a variation in sizes of the granules of the third adsorbent and a variation in sizes of the granules of the first adsorbent.

19. A fuel vapor processing apparatus comprising:
a first adsorption chamber defining a first volumetric capacity and containing a first adsorbent comprising a plurality of granules having a first average granule diameter;
a second adsorption chamber defining a second volumetric capacity and containing a second adsorbent comprising a plurality of granules having a second average granule diameter; and
a third adsorption chamber defining a third volumetric capacity and containing a third adsorbent comprising a plurality of granules having a third average granule diameter;
wherein:
the second average granule diameter is larger than both the first average granule diameter and the third average granule diameter;
the first, second and third adsorption chambers are connected in series such that the first adsorption chamber is located on an upstream side of the second adsorption chamber with respect to a direction of flow of fuel vapor to be adsorbed and on a downstream side of the second adsorption chamber with respect to a direction of flow of atmospheric air for desorption of adsorbed fuel vapor;
a ratio of a length of the second adsorption chamber in the direction of flow of the fuel vapor or the atmospheric air to a cross sectional area of the second adsorption chamber perpendicular to the direction of flow of the fuel vapor or the atmospheric air is larger than a ratio of a length of the first adsorption chamber in a direction of flow of the fuel vapor or the atmospheric air to a cross sectional area of the first adsorption chamber perpendicular to the direction of flow of the fuel vapor or the atmospheric air;

the cross sectional area of the second adsorption chamber is smaller than the cross sectional area of the first adsorption chamber; and a cross sectional area of the third adsorption chamber perpendicular to the direction of flow of the fuel vapor or the atmospheric air is smaller than the cross sectional area of the first adsorption chamber.

* * * * *